(12) United States Patent
Lai et al.

(10) Patent No.: US 11,841,612 B2
(45) Date of Patent: Dec. 12, 2023

(54) ILLUMINATION SYSTEM AND PROJECTION DEVICE

(71) Applicant: Coretronic Corporation, Hsin-Chu (TW)

(72) Inventors: Jyun-Cong Lai, Hsin-Chu (TW); Haw-Woei Pan, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/506,682

(22) Filed: Oct. 21, 2021

(65) Prior Publication Data

US 2022/0171266 A1    Jun. 2, 2022

(30) Foreign Application Priority Data

Nov. 30, 2020  (CN) .......................... 202022817380.1

(51) Int. Cl.
*G03B 21/20* (2006.01)
*G02B 27/14* (2006.01)
*G03B 33/08* (2006.01)

(52) U.S. Cl.
CPC ......... *G03B 21/204* (2013.01); *G03B 21/208* (2013.01); *G03B 21/2066* (2013.01); *G02B 27/141* (2013.01); *G03B 33/08* (2013.01)

(58) Field of Classification Search
CPC  G03B 21/204; G03B 21/2066; G03B 21/208; G03B 33/08; G02B 27/141
See application file for complete search history.

(56) References Cited

U.S. PATENT DOCUMENTS

| 10,989,998 | B2 * | 4/2021 | Hu | G03B 21/208 |
| 2015/0316775 | A1 * | 11/2015 | Hsieh | G03B 21/2013 353/31 |
| 2015/0338061 | A1 * | 11/2015 | Huang | G03B 21/2066 353/31 |
| 2016/0062220 | A1 * | 3/2016 | Kato | H04N 9/3111 353/31 |

(Continued)

FOREIGN PATENT DOCUMENTS

| CN | 102645829 | 11/2014 |
| CN | 107479313 | 12/2017 |

*Primary Examiner* — Magda Cruz
(74) *Attorney, Agent, or Firm* — JCIPRNET (57) ABSTRACT

An illumination system includes a light source providing a first light beam, a first light uniformizing element disposed on a transmission path of the first light beam, a wavelength conversion element, and an optical part. The wavelength conversion element is disposed on the same transmission path and converts the first light beam into a second light beam. The optical part is disposed on a transmission path of the second light beam. The wavelength conversion element is disposed between the first light uniformizing element and the optical part. The second light beam includes a first portion, which is transmitted toward the first light uniformizing element, and a second portion, which is transmitted toward the optical part, reflected by the optical part, and further transmitted and passes through the wavelength conversion element for being transmitted toward the first light uniformizing element. A projection device including the illumination system is also provided.

18 Claims, 10 Drawing Sheets

(56) References Cited

U.S. PATENT DOCUMENTS

| | | | | |
|---|---|---|---|---|
| 2016/0327851 A1* | 11/2016 | Liao | .................. | G03B 21/2066 |
| 2017/0328540 A1* | 11/2017 | Paul | .................. | G03B 21/204 |
| 2018/0299758 A1* | 10/2018 | Liao | .................. | G03B 21/204 |
| 2019/0235368 A1* | 8/2019 | Liao | .................. | G03B 21/2066 |
| 2019/0235370 A1* | 8/2019 | Weng | .................. | G03B 21/2006 |
| 2019/0353995 A1* | 11/2019 | Pan | .................. | H04N 9/3155 |
| 2019/0369470 A1* | 12/2019 | Yang | .................. | G03B 21/2066 |
| 2021/0033953 A1* | 2/2021 | Guo | .................. | G03B 21/2013 |
| 2021/0247677 A1* | 8/2021 | Chen | .................. | G03B 21/204 |
| 2022/0075252 A1* | 3/2022 | Pan | .................. | G03B 21/204 |
| 2022/0091495 A1* | 3/2022 | Fan | .................. | G03B 21/2073 |
| 2022/0132086 A1* | 4/2022 | Liao | .................. | H04N 9/3111 |
| 2022/0171267 A1* | 6/2022 | Takano | .................. | G03B 21/208 |
| 2023/0021207 A1* | 1/2023 | Wu | .................. | G03B 21/208 |

\* cited by examiner

ILLUMINATION SYSTEM AND PROJECTION DEVICE

CROSS-REFERENCE TO RELATED APPLICATION

This application claims the priority benefit of China application serial No. 202022817380.1, filed on Nov. 30, 2020. The entirety of the above-mentioned patent application is hereby incorporated by reference herein and made a part of this specification.

BACKGROUND

Technical Field

The disclosure relates to an optical system and an electronic device, and in particular, relates to an illumination system and a projection device.

Description of Related Art

Projection devices are display devices configured to display large-size images. The imaging principle of the projection devices is to convert an illumination light beam generated by an illumination system into an image light beam through a light valve. The image light beam is then projected onto a projection target (e.g., a screen or a wall) through a projection lens to form a projection image.

In addition, along with market's demand for projection devices exhibiting improved brightness, enhanced color saturation, long service life, and non-toxic and environmental protection, the illumination system has evolved from ultra-high-performance lamps (UHP lamps), light-emitting diodes (LED) to the most advanced laser diode (LD) light sources. However, in a currently-available optical system, transmission of laser light through a wavelength conversion device may cause scattering, which results in reduction of light emitting efficiency of a projection device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to an illumination system and a projection device capable of effectively reusing a scattered light beam transmitted back in a second light beam and accordingly preventing light emitting intensity of an illumination light beam from being reduced.

Other objects and advantages of the disclosure may be further illustrated by the technical features broadly embodied and described as follows.

In order to achieve one or a portion of or all of the objects or other objects, an embodiment of the disclosure provides an illumination system including a light source, a first light uniformizing element, a wavelength conversion element, and an optical part. The light source is configured to provide a first light beam. The first light uniformizing element is disposed on a transmission path of the first light beam. The wavelength conversion element is disposed on the transmission path of the first light beam and is configured to convert the first light beam into a second light beam. The optical part is disposed on a transmission path of the second light beam. The wavelength conversion element is disposed between the first light uniformizing element and the optical part. The second light beam includes a first portion and a second portion. The first portion is transmitted toward the first light uniformizing element. The second portion is transmitted toward the optical part, is reflected by the optical part, and is further transmitted and passes through the wavelength conversion element for being transmitted toward the first light uniformizing element.

In order to achieve one or a portion of or all of the objects or other objects, an embodiment of the disclosure provides a projection device including an illumination system, at least one light valve, and a projection lens. The illumination system is configured to provide an illumination light beam. The illumination system includes a light source, a first light uniformizing element, a wavelength conversion element, and an optical part. The light source is configured to provide a first light beam. The first light uniformizing element is disposed on a transmission path of the first light beam. The wavelength conversion element is disposed on the transmission path of the first light beam and is configured to convert the first light beam into a second light beam. The optical part is disposed on a transmission path of the second light beam. The wavelength conversion element is disposed between the first light uniformizing element and the optical part. The at least one light valve is disposed on a transmission path of the illumination light beam for converting the illuminating light beam into an image light beam. The projection lens is disposed on a transmission path of the image light beam, and is configured to project the image light beam out of the projection device. The second light beam includes a first portion and a second portion. The first portion is transmitted toward the first light uniformizing element. The second portion is transmitted toward the optical part, is reflected by the optical part, and is further transmitted and passes through the wavelength conversion element for being transmitted toward the first light uniformizing element.

Based on the above, in the illumination system and the projection device of the disclosure, the illumination system includes the light source, the first light uniformizing element, the wavelength conversion element, and the optical part. The optical part is disposed on the transmission path of the scattered light beam generated through excitation of the wavelength conversion element and is configured to reflect and transmit the light beam toward the wavelength conversion element. In this way, the scattered light beam transmitted back in the second light beam is effectively reused, and the light emitting intensity of the illumination light beam is therefore prevented from being reduced.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
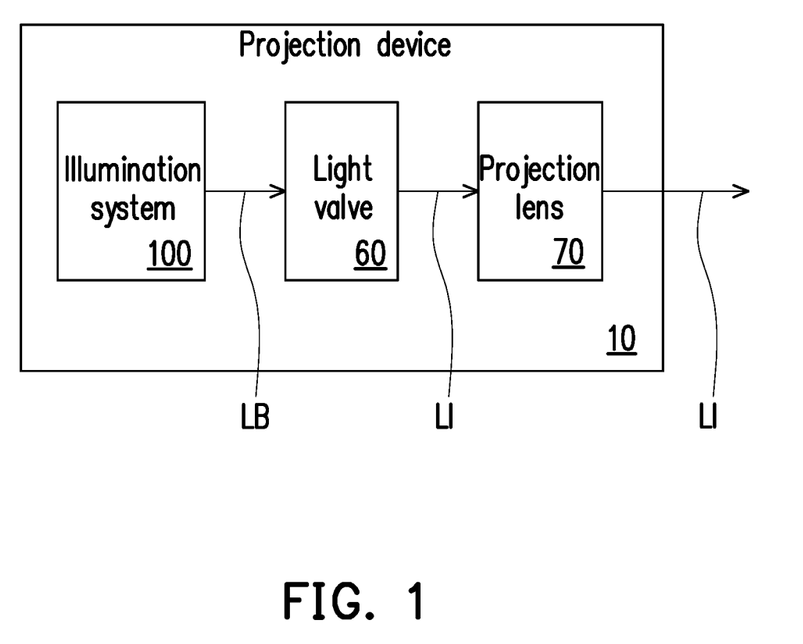
FIG. 1 is a schematic diagram of a projection device according to an embodiment of the disclosure.

FIG. 1 is a schematic diagram of a projection device according to an embodiment of the disclosure. Referring to FIG. 1, the embodiment provides a projection device 10 including an illumination system 100, at least one light valve 60, and a projection lens 70. The illumination system 100 is configured to provide an illumination light beam LB. The at least one light valve 60 is disposed on a transmission path of the illumination light beam LB for converting the illumination light beam LB into an image light beam LI. The projection lens 70 is disposed on a transmission path of the image light beam LI and is configured to project the image light beam LI out of the projection device 10 to a projection target (not shown), such as a screen or a wall.

In this embodiment, the at least one light valve 60 is, for example, a reflective light modulator such as a digital micro-mirror device (DMD), a liquid crystal on silicon panel (LCoS panel), etc. In some embodiments, the light valve 60 may also be a transmissive light modulator such as a transparent liquid crystal panel, an electro-optical modulator, a magneto-optic modulator, or an acousto-optic modulator (AOM) and so on. The form and type of the light valve 60 are not particularly limited by the disclosure. Sufficient teachings, suggestions, and implementations description of detailed steps and implementations of the method allowing the light valve 60 to convert the illuminating light beam LB into the image light beam LI may be obtained from general knowledge in the art and is not be repeated herein. In this embodiment, a number of the light valve 60 is one. For example, the projection device 10 uses a single digital micro-mirror device. But in other embodiments, the number of the light valves 60 may be multiple, which is not particularly limited by the disclosure.

The projection lens 70 includes, for example, a combination of one or more optical lenses having refractive powers, for example, a non-planar lens such as a biconcave lens, a biconvex lens, a concavo-convex lens, a convexo-concave lens, a plano-convex lens, a plano-concave lens, etc., or various combinations thereof. In an embodiment, the projection lens 70 may further include a planar optical lens to project the image light beam LI coming from the light valve 60 to the projection target in a reflective manner. The pattern and type of the projection lens 70 are not limited by the disclosure.

Figure 2:
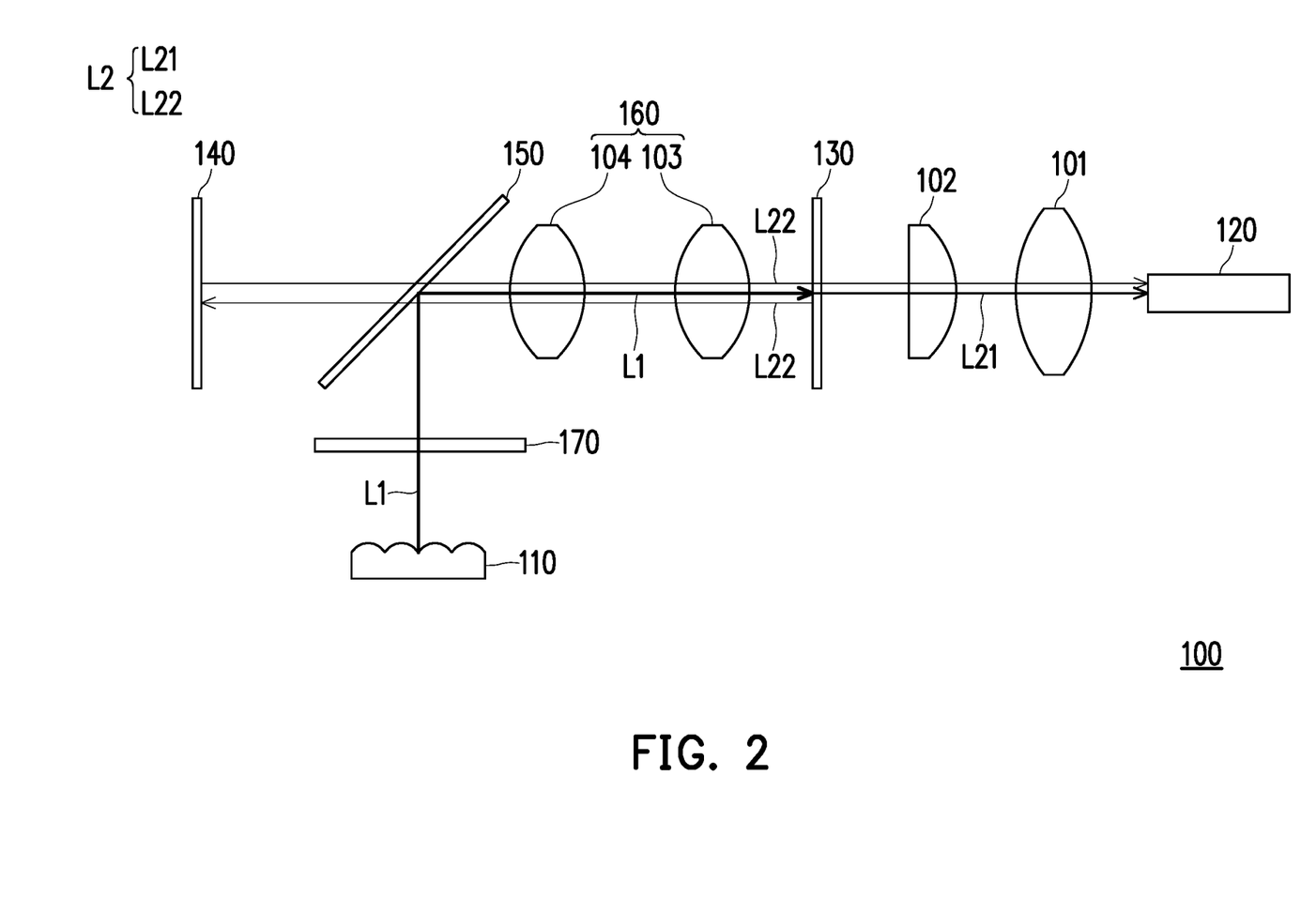
FIG. 2 is a schematic diagram of an illumination system according to an embodiment of the disclosure.

FIG. 2 is a schematic diagram of an illumination system according to an embodiment of the disclosure. Referring to FIG. 1 and FIG. 2, the illumination system 100 of the embodiment may be the illumination system 100 shown in FIG. 1 and is configured to provide the illumination light beam LB. For example, in this embodiment, the illumination system 100 is formed by a plurality of light-emitting elements, a wavelength conversion element, a light uniformizing element, a filter element, and a plurality of light splitting and combining elements for providing light of different wavelengths to serve as a source of the illumination light beam. The illumination system 100 includes a light source 110, a first light uniformizing element 120, a wavelength conversion element 130 and an optical part 140. In detail, the illumination system 100 further includes a light splitting element 150, a beam contraction module 160, and a relay element 170, but the disclosure is not limited thereto.

The light source 110 is configured to provide a first light beam L1. In this embodiment, the light source 110 is a blue laser diode, which emits a blue excitation light beam. As such, the first light beam L1 is a blue light beam, but the disclosure is not limited thereto.

The first light uniformizing element 120 is disposed on a transmission path of the first light beam L1. The first light uniformizing element 120 is configured to adjust a light spot shape of light beams to form the illumination light beam LB. As such, the light spot shape of the illumination light beam LB may match a shape (e.g., a rectangle) of a working area of the light valve 60, and the light spot may have the same or similar light intensity everywhere. Light intensity of the illumination light beam LB may thus be uniformized. In this embodiment, the first light uniformizing element 120 is, for example, an integrating rod, but in other embodiments, the first light uniformizing element 120 may also be other appropriate types of optical elements, such as a lens array (a fly eye lens array), which is not limited by the disclosure.

The wavelength conversion element 130 is disposed on the transmission path of the first light beam L1 and is configured to convert the first light beam L1 into a second light beam L2. The wavelength conversion element 130 is, for example, a wavelength conversion phosphor wheel. The wavelength conversion phosphor wheel receives the first light beam L1 and may rotate according to a time sequence. In the embodiment, the wavelength conversion phosphor wheel has a light-transmitting region and at least one wavelength conversion material region. The light-transmitting region allows the first light beam L1 to pass through. The at least one wavelength conversion material region includes a wavelength conversion material (e.g., the phosphor material), the wavelength conversion material used to convert blue light into yellow-green light. In other words, in the embodiment, when the first light beam L1 acting as the blue light is transmitted to the at least one wavelength conversion material region of the wavelength conversion element 130, the first light beam L1 is converted into the second light beam L2 acting as the yellow-green light. In the embodiment, the wavelength conversion element 130 is a transmissive type. Furthermore, the wavelength conversion element 130 has a light-transmitting substrate. When the first light beam L1 incidents the wavelength conversion material (as shown in FIG. 2), the second light beam L2 is formed. The second light beam L2 includes a first portion L21 and a second portion L22. The first portion L21 is the second light beam L2 emitted toward the first light uniformizing element 120 after conversion (the first light uniformizing element 120 is disposed on a transmission path of the second light beam L2), and the second portion L22 is the second light beam L2 emitted in a direction opposite to the first portion L21 after conversion.

In other embodiments, a plurality of wavelength conversion materials may be provided to sequentially generate red, green, and yellow converted light beams. The number of the wavelength conversion materials is not limited by the disclosure. It should be noted that if a 3-piece type light valve is equipped, only one wavelength conversion material is required on the wavelength conversion phosphor wheel, and the light-transmitting region is not required to be arranged because a blue light source may be additionally added for the blue light part of the projection device, which is not limited by the disclosure.

The light splitting element 150 is disposed on the transmission path of the first light beam L1. The wavelength conversion element 130 is located between the first light uniformizing element 120 and the light splitting element 150. The light splitting element 150 is configured to allow one of the first light beam L1 and the second light beam L2 to pass through and reflect the other one. In this embodiment, the light splitting element 150 is, for example, a dichroic mirror with blue reflection (DMB) for reflecting the first light beam L1 and allowing the second light beam L2 to pass through. However, in other embodiments, arrangement positions of the light source 110 and the optical part 140 may be switched, and the light splitting element 150 may also be designed as a dichroic mirror with green and orange reflect (DMGO) for reflecting the second light beam L2 and allowing the first light beam L1 to pass through.

The beam contraction module 160 is disposed on the transmission path of the first light beam L1 and is located between the light splitting element 150 and the wavelength conversion element 130. The beam contraction module 160 is configured to adjust the first light beam L1 into parallel light to enter the wavelength conversion element 130 in collimation. For example, the beam contraction module 160 includes lenses 103 and lenses 104. However, in other embodiments, the beam contraction module 160 may include other types of optical elements, which is not limited by the disclosure.

The relay element 170 is disposed on the transmission path of the first light beam L1 and is located between the light source 110 and the light splitting element 150. In this embodiment, the relay element 170 is, for example, a fly eye lens configured to allow a light beam to be effectively applied and allow the light beam and energy thereof to be uniformized. However, in other embodiments, the relay element 170 may include other types of optical elements, which is not limited by the disclosure. In addition, in this embodiment, the illumination system 100 may be selectively provided with other types of optical elements (such as lenses or mirrors) on other positions, such as lenses 101 and 102 located between the first light uniformizing element 120 and the wavelength conversion element 130 and configured to guide the light beam to the first light uniformizing element 120.

The optical part 140 is disposed on a transmission path of the second light beam L2, and the light splitting element 150 is located between the optical part 140 and the wavelength conversion element 130. In this embodiment, the optical part 140 is a plane mirror. To be specific, the second light beam L2 includes the first portion L21 and the second portion L22. The first portion L21 is transmitted toward the first light uniformizing element 120, and the second portion L22 is transmitted toward the optical part 140. The second portion L22 is reflected by the optical part 140, is transmitted to the wavelength conversion element 130, and passes through the wavelength conversion element 130 for being transmitted to the first light uniformizing element 120. Further, the second portion L22 of the second light beam L2 passes through the region of the wavelength conversion element 130 with the wavelength conversion material (the wavelength conversion material region). That is, when the first light beam L1 is transmitted to the wavelength conversion material region of the wavelength conversion element 130, a portion of the second light beam L2 (i.e., the first portion L21) formed through excitation of the wavelength conversion material is continuously transmitted to the first light uniformizing element 120 along an original path (original direction), and the other portion of the second light beam L2 generates a scattered light beam (i.e., the second portion L22) through the light-transmitting substrate of the wavelength conversion element 130 (i.e., the second portion L22 of the second light beam L2 is the scattered light beam transmitted toward the optical part 140 in the second light beam L2). It should be noted that in this embodiment, the second portion L22 (the scattered light beam) is transmitted back to the wavelength conversion element 130 through reflection of the optical part 140 and is then transmitted to the first light uniformizing element 120 along the transmission path of the first light beam L1. In this way, the second light beam L2 may be effectively reused, and the light emitting intensity of the illumination light beam LB is therefore prevented from being reduced.

Figure 3:
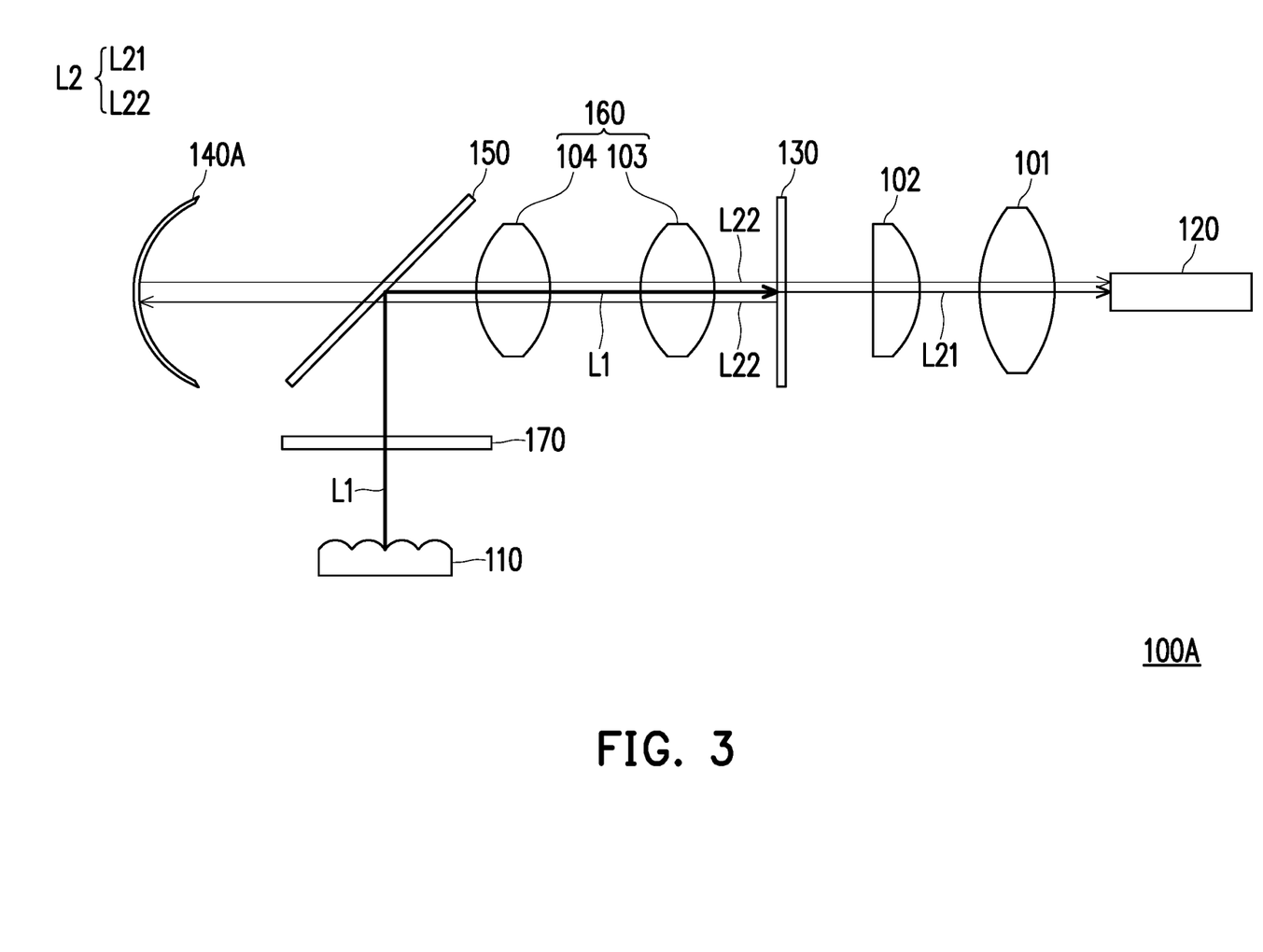
FIG. 3 is a schematic diagram of an illumination system according to another embodiment of the disclosure.

FIG. 3 is a schematic diagram of an illumination system according to another embodiment of the disclosure. Referring to FIG. 3, an illumination system 100A of this embodiment is similar to the illumination system 100 shown in FIG. 2. A difference therebetween is that, in this embodiment, an optical part 140A is a concave mirror. Therefore, when the second portion L22 of the second light beam L2 is transmitted from the wavelength conversion element 130 to the optical part 140A, a recycle effect of the second portion L22 of the second light beam L2 may be improved through a refractive power of the optical part 140A. In other words, in addition to adjusting the transmission path of the second portion L22 of the second light beam L2, the optical part 140A may further adjust a light shape of the second portion L22 of the second light beam L2 through the optical effect of the optical part 140A.

Figure 4:
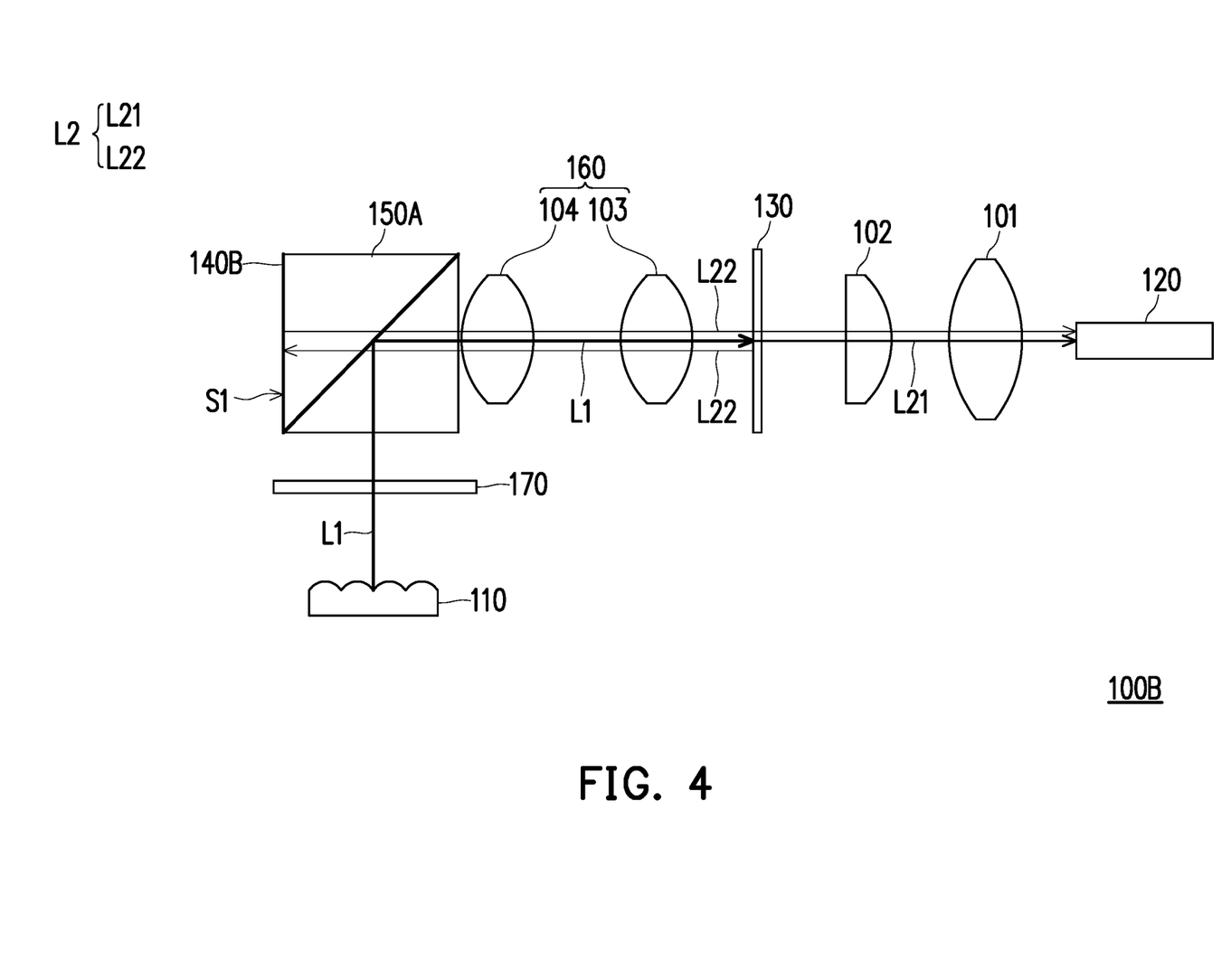
FIG. 4 is a schematic diagram of an illumination system according to another embodiment of the disclosure.

FIG. 4 is a schematic diagram of an illumination system according to another embodiment of the disclosure. Referring to FIG. 4, an illumination system 100B of the embodiment is similar to the illumination system 100 shown in FIG. 2. A difference therebetween is that, in this embodiment, a light splitting element 150A is a cubic light splitter with a surface S1. An optical part 140B is formed on the surface S1 of the light splitting element 150A away from the wavelength conversion element 130. To be specific, the optical part 140B is, for example, a reflective coating. Therefore, the number of the optical components may be further reduced, and a volume occupied by the illumination system 100B is decreased.

Figure 5:
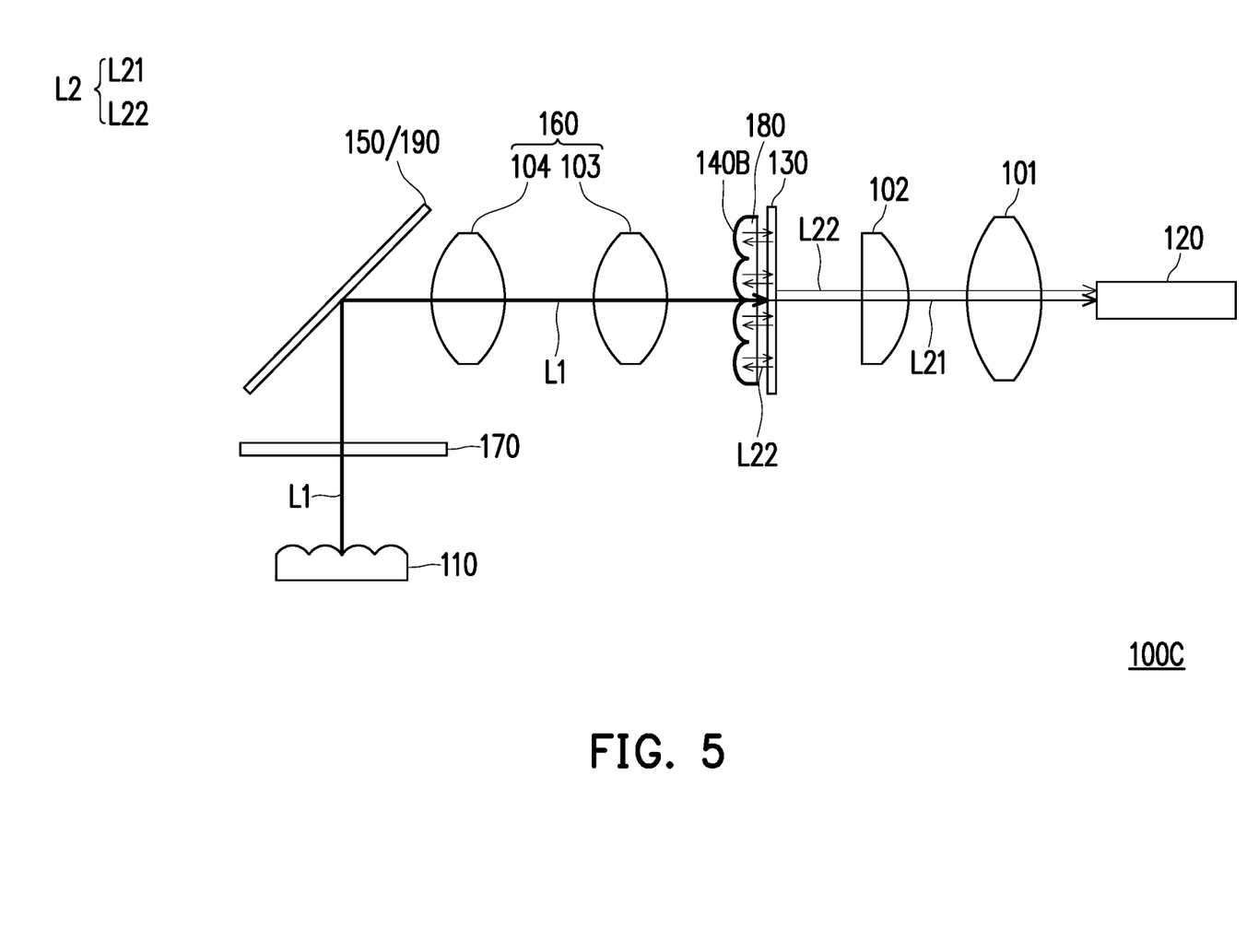
FIG. 5 is a schematic diagram of an illumination system according to another embodiment of the disclosure.

FIG. 5 is a schematic diagram of an illumination system according to another embodiment of the disclosure. Referring to FIG. 5, an illumination system 100C of this embodiment is similar to the illumination system 100 shown in FIG. 2. A difference therebetween is that, in this embodiment, the illumination system 100C further includes an array lens 180. The wavelength conversion element 130 is disposed between the array lens 180 and the first light uniformizing element 120. The optical part 140B is formed on a curved surface of the array lens 180, and the optical part 140B is used for allowing the first light beam L1 to pass through and reflecting the second light beam L2 (the second portion L22). To be specific, in this embodiment, the optical part 140B is, for example, a coating with green and orange reflection and is formed on a surface of the array lens 180 with refractive power away from the wavelength conversion element 130 in a way of coating. Therefore, the number of the optical components may be further reduced, and a volume occupied by the illumination system 100C is decreased. In addition, the light shape of the second portion L22 of the second light beam L2 may be further adjusted by the optical effect of the array lens 180. In this embodiment, a mirror 190 may be further arranged to replace the light splitting element 150, which is not limited by the disclosure.

Figure 6:
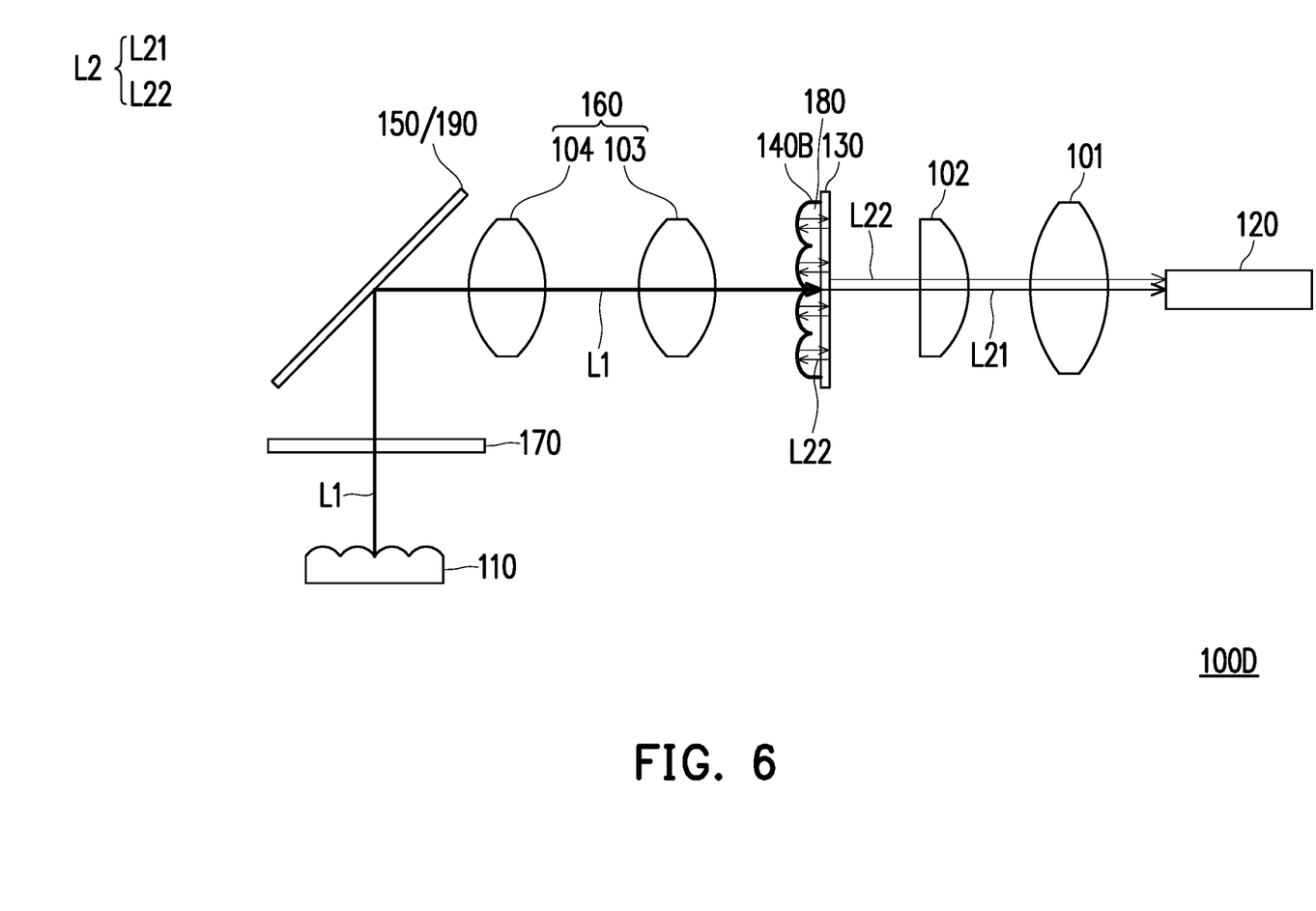
FIG. 6 is a schematic diagram of an illumination system according to another embodiment of the disclosure.

FIG. 6 is a schematic diagram of an illumination system according to another embodiment of the disclosure. Referring to FIG. 6, an illumination system 100D of this embodiment is similar to the illumination system 100C shown in FIG. 5. A difference therebetween is that, in this embodiment, the array lens 180 of the illumination system 100D is cemented with the wavelength conversion element 130. Therefore, a volume occupied by the illumination system 100D may be further reduced, and the recycle effect of the second light beam L2 may be further improved. In this embodiment, the mirror 190 may be further arranged to replace the light splitting element 150, which is not limited by the disclosure.

Figure 7:
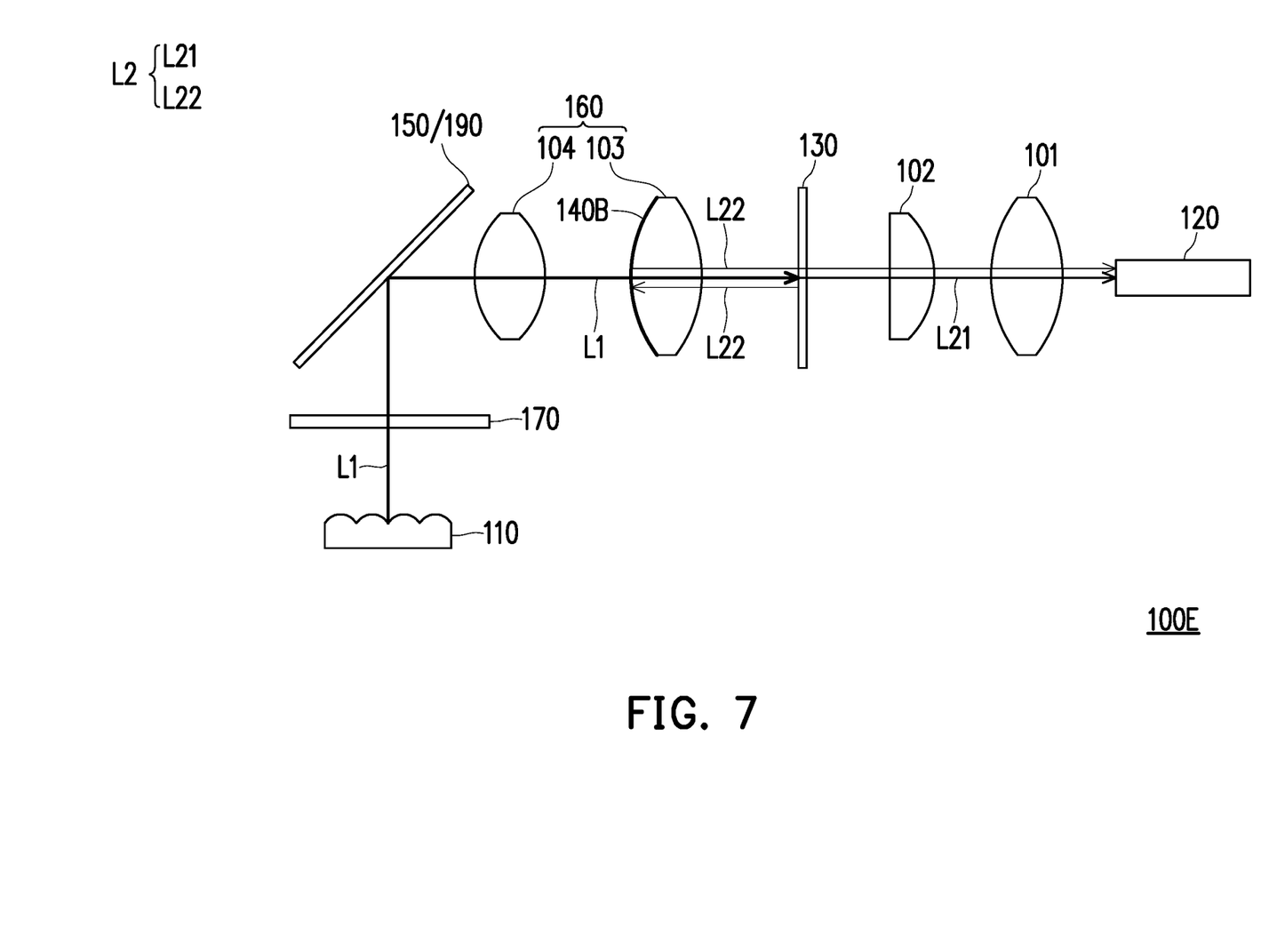
FIG. 7 is a schematic diagram of an illumination system according to another embodiment of the disclosure.

FIG. 7 is a schematic diagram of an illumination system according to another embodiment of the disclosure. Referring to FIG. 7, an illumination system 100E of the embodiment is similar to the illumination system 100 shown in FIG. 2. A difference therebetween is that, in this embodiment, the beam contraction module 160 includes a plurality of lenses 103 and 104. The optical part 140B is formed on the lens 103, and the optical part 140B is used for allowing the first light beam L1 to pass through and reflecting the second light beam L2. To be specific, in this embodiment, the optical part 140B is, for example, a coating with green and orange reflection and is formed on a surface of the lens 103 with refractive power away from the wavelength conversion element 130 in a way of coating. Therefore, the number of the optical components may be further reduced, and a volume occupied by the illumination system 100E is decreased. In this embodiment, the mirror 190 may be further arranged to replace the light splitting element 150, which is not limited by the disclosure.

Figure 8:
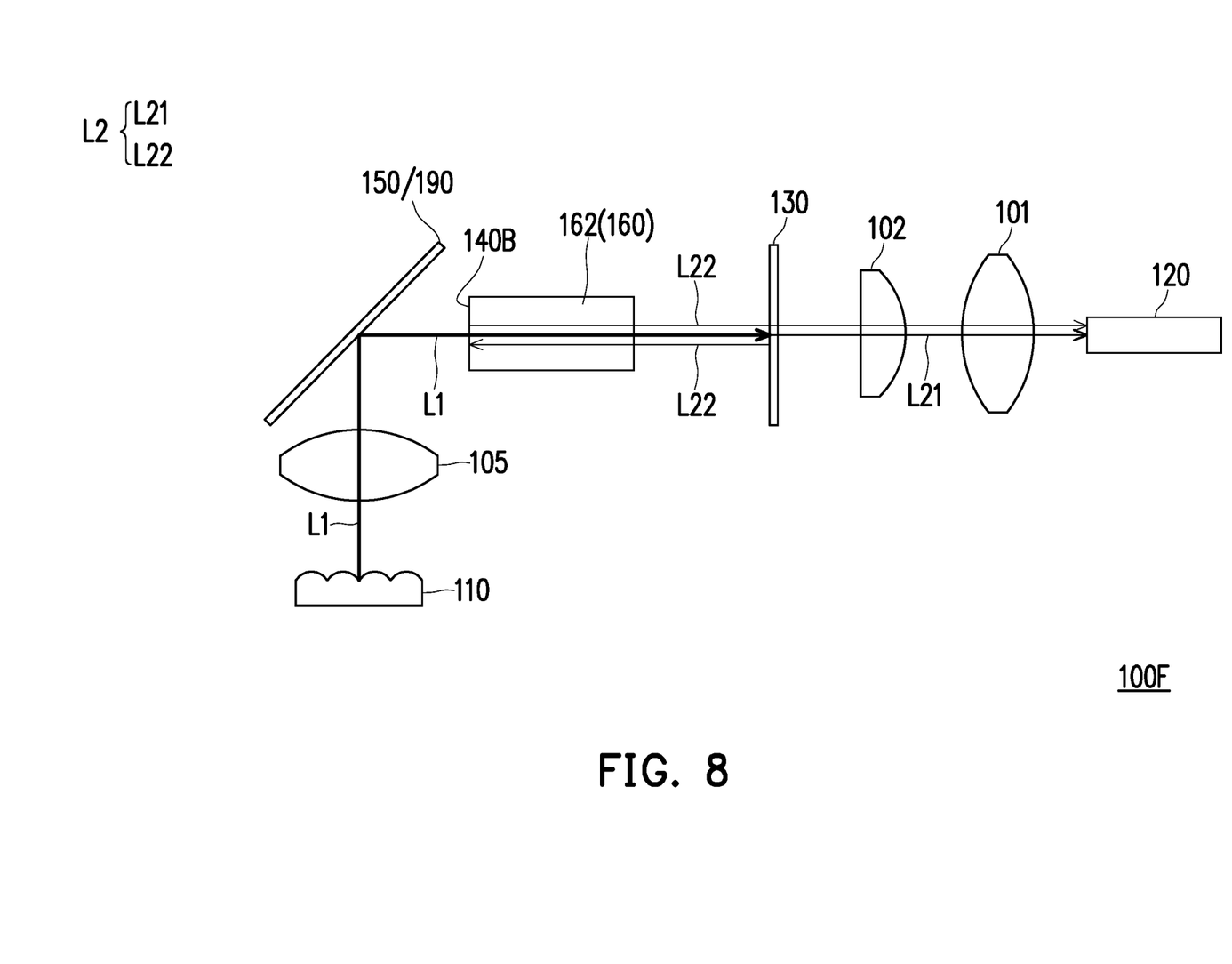
FIG. 8 is a schematic diagram of an illumination system according to another embodiment of the disclosure.

FIG. 8 is a schematic diagram of an illumination system according to another embodiment of the disclosure. Referring to FIG. 8, an illumination system 100F of this embodiment is similar to the illumination system 100 shown in FIG. 2. A difference therebetween is that, in this embodiment, the beam contraction module 160 includes a second light uniformizing element 162. The optical part 140B is formed on a surface of the second light uniformizing element 162 away from the wavelength conversion element 130. The optical part 140B is used for allowing the first light beam L1 to pass through and reflecting the second light beam L2. To be specific, in this embodiment, the second light uniformizing element 162 is, for example, an integrating rod, and the optical part 140B is, for example, a coating with green and orange reflection. Therefore, a lens 105 may be further arranged to replace the fly eye lens between the light source 110 and the light splitting element 150. In this way, the number of the optical components may be further reduced, and a volume occupied by the illumination system 100F is decreased. In addition, the light shape of the second portion L22 of the second light beam L2 may be further adjusted by the optical effect of the second light uniformizing element 162. In this embodiment, the mirror 190 may be further arranged to replace the light splitting element 150, which is not limited by the disclosure.

Figure 9:
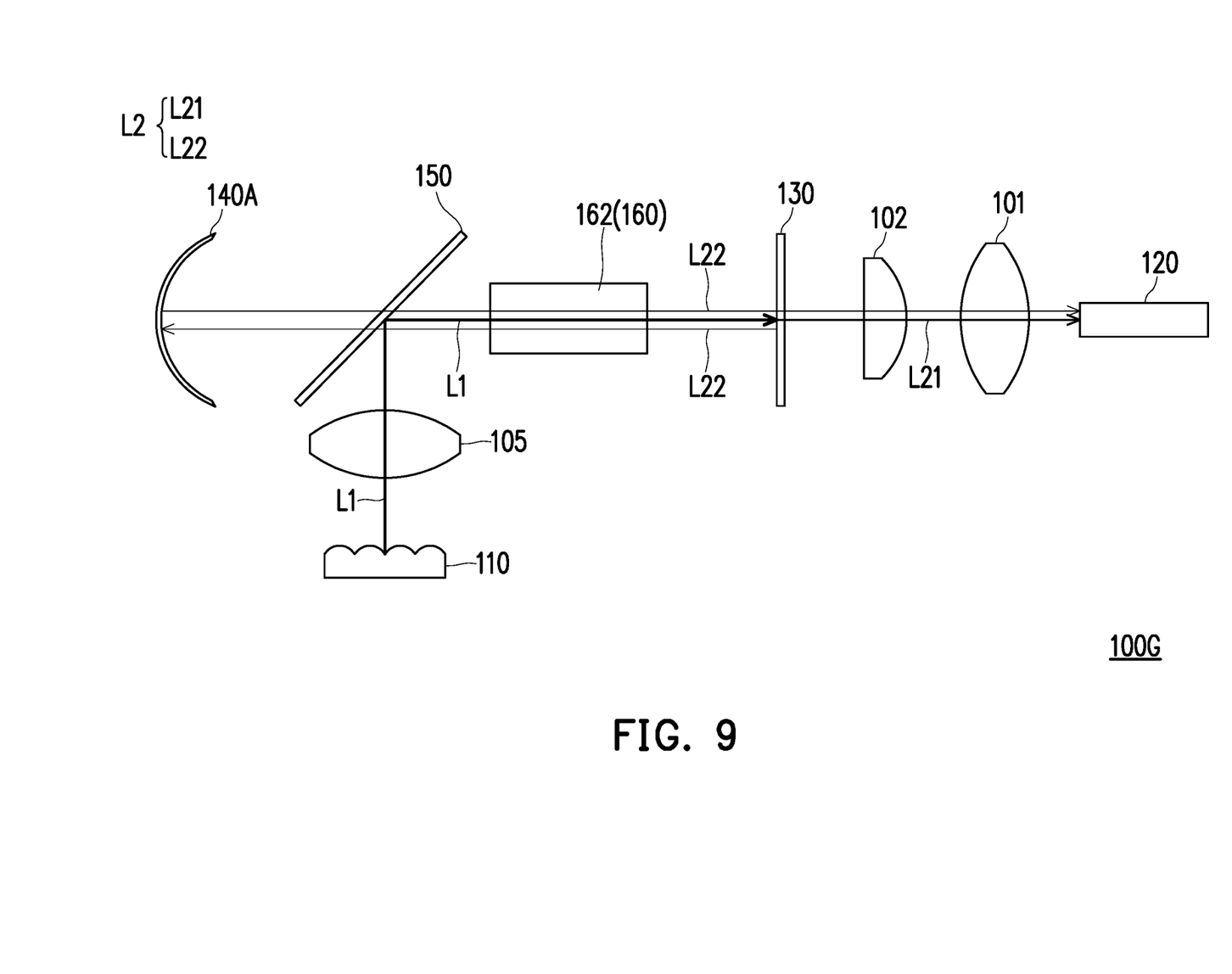
FIG. 9 is a schematic diagram of an illumination system according to another embodiment of the disclosure.

FIG. 9 is a schematic diagram of an illumination system according to another embodiment of the disclosure. Referring to FIG. 9, an illumination system 100G of the embodiment is similar to the illumination system 100F shown in FIG. 8. A difference therebetween is that, in this embodiment, the optical part 140A is a concave mirror to replace the optical part 140B formed on the surface of the second light uniformizing element 162, and the light splitting element 150 is located between the optical part 140A and the second light uniformizing element 162. In this way, in addition to adjusting the transmission path of the second portion L22 of the second light beam L2, the optical part 140A may further adjust the light shape of the second portion L22 of the second light beam L2 through the optical effect of the optical part 140A.

Figure 10:
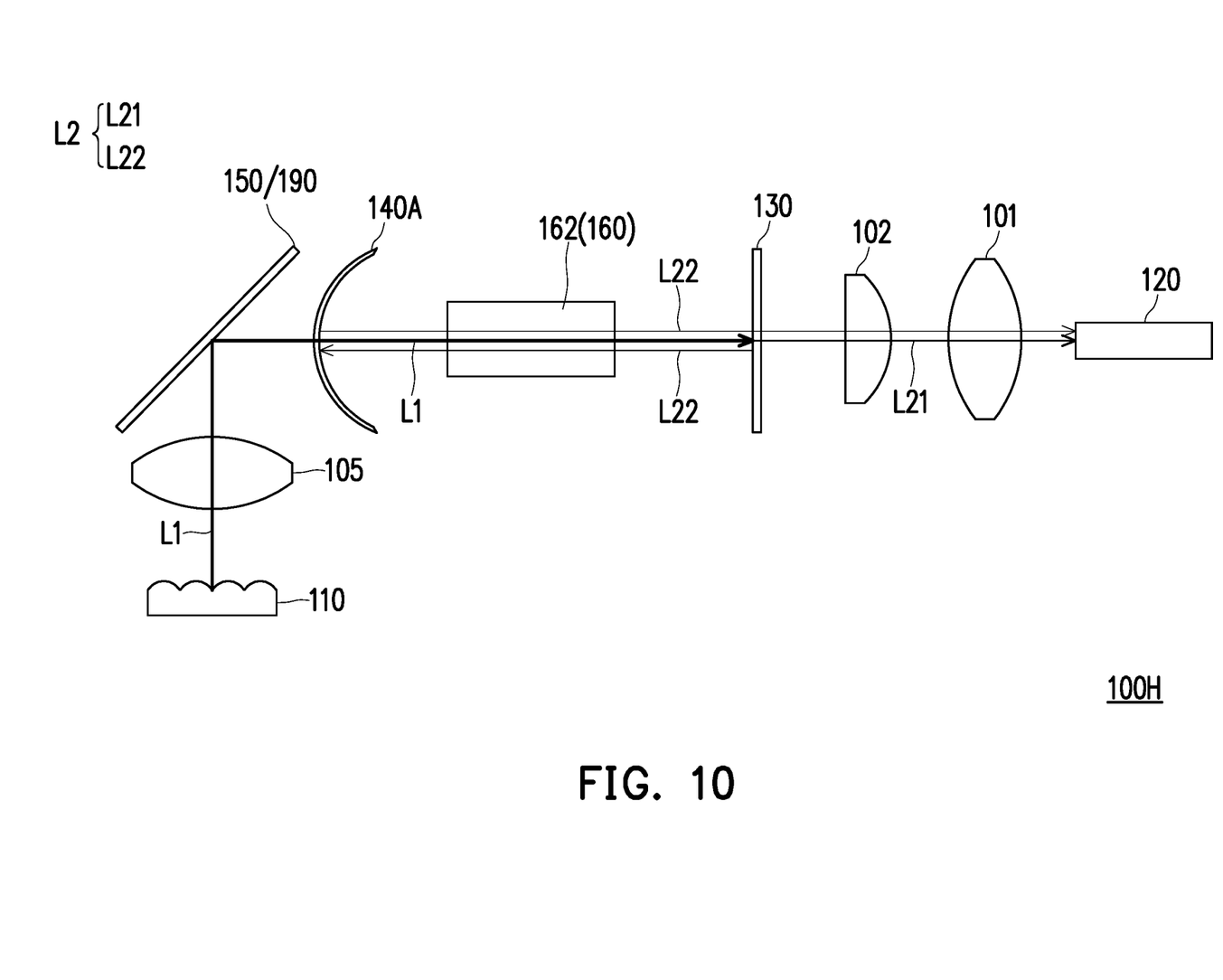
FIG. 10 is a schematic diagram of an illumination system according to another embodiment of the disclosure.

FIG. 10 is a schematic diagram of an illumination system according to another embodiment of the disclosure. Referring to FIG. 10, an illumination system 100H of this embodiment is similar to the illumination system 100G shown in FIG. 9. A difference therebetween is that, in this embodiment, the optical part 140A is disposed between the light splitting element 150 and the second light uniformizing element 162 and allows the first light beam L1 to pass through. In this way, in addition to adjusting the transmission path of the second portion L22 of the second light beam L2, the optical part 140A may further adjust the light shape of the second portion L22 of the second light beam L2 through the optical effect of the optical part 140A and may reduce a volume occupied by the illumination system 100H. In this embodiment, the mirror 190 may be further arranged to replace the light splitting element 150, which is not limited by the disclosure.

In view of the foregoing, in the illumination system and the projection device of the disclosure, the illumination system includes the light source, the first light uniformizing element, the wavelength conversion element, and the optical part. The optical part is disposed on the transmission path of the reflective light beam generated through excitation of the wavelength conversion element and is used for reflecting and transmitting the light beam toward the wavelength conversion element. In this way, the scattered light beam transmitted back in the second light beam is effectively reused, and the light emitting intensity of the illumination light beam is prevented from being reduced.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination system, comprising a light source, a first light uniformizing element, a wavelength conversion element, a light splitting element and an optical part, wherein
the light source is configured to provide a first light beam,
the first light uniformizing element is disposed on a transmission path of the first light beam,
the wavelength conversion element is disposed on the transmission path of the first light beam and is configured to convert the first light beam into a second light beam, wherein the first light beam is an excitation light and the second light beam is an excited light, the second light beam comprises a first portion and a second portion, and a wavelength of the first light beam is different from a wavelength of the second light beam,
the light splitting element is disposed on the transmission path of the first light beam, and the light splitting element is configured to reflect the first light beam and allow the second light beam to pass through, and
the optical part is disposed on a transmission path of the second light beam and is not disposed on the transmission path of the first light beam, and the wavelength conversion element is disposed between the first light uniformizing element and the optical part, wherein the first portion is transmitted toward the first light uniformizing element by passing through the wavelength conversion element, and the second portion is transmitted toward the optical part, the second portion is reflected by the optical part, and is further transmitted and passes through the wavelength conversion element for being transmitted toward the first light uniformizing element.

2. The illumination system according to claim 1, wherein the second portion of the second light beam is a scattered light beam generated by the wavelength conversion element.

3. The illumination system according to claim 1, wherein the optical part is a plane mirror or a concave mirror, and the light splitting element is located between the optical part and the wavelength conversion element.

4. The illumination system according to claim 1, wherein the light splitting element is a cubic light splitter, and the optical part is formed on a surface of the light splitting element away from the wavelength conversion element.

5. The illumination system according to claim 1, further comprising:
a beam contraction module, comprising a plurality of lenses, wherein the optical part is formed on one of the plurality of lenses, and the optical part is configured to allow the first light beam to pass through.

6. The illumination system according to claim 1, further comprising:
a beam contraction module, comprising a second light uniformizing element, wherein the optical part is a concave mirror.

7. A projection device, comprising an illumination system, at least one light valve, and a projection lens, wherein:
the illumination system is configured to provide an illumination light beam, and the illumination system comprises a light source, a first light uniformizing element, a wavelength conversion element, a light splitting element and an optical part, wherein:
the light source is configured to provide a first light beam,
the first light uniformizing element is disposed on a transmission path of the first light beam,
the wavelength conversion element is disposed on the transmission path of the first light beam and is configured to convert the first light beam into a second light beam, wherein the first light beam is an excitation light and the second light beam is an excited light, the second light beam comprises a first portion and a second portion, and a wavelength of the first light beam is different from a wavelength of the second light beam, the light splitting element is disposed on the transmission path of the first light beam, and the light splitting element is configured to reflect the first light beam and allow the second light beam to pass through, and the optical part is disposed on a transmission path of the second light beam and is not disposed on the transmission path of the first light beam, and the wavelength conversion element is disposed between the first light uniformizing element and the optical part, the at least one light valve is disposed on a transmission path of the illumination light beam for converting the illuminating light beam into an image light beam, and the projection lens is disposed on a transmission path of the image light beam and is configured to project the image light beam out of the projection device, wherein the first portion is transmitted toward the first light uniformizing element by passing through the wavelength conversion element, and the second portion is transmitted toward the optical part, is reflected by the optical part, and is further transmitted and passes through the wavelength conversion element for being transmitted toward the first light uniformizing element.

8. The projection device according to claim 7, wherein the second portion of the second light beam is a scattered light beam generated by the wavelength conversion element.

9. The projection device according to claim 7, wherein the optical part is a plane mirror or a concave mirror, and the light splitting element is located between the optical part and the wavelength conversion element.

10. The projection device according to claim 7, wherein the light splitting element is a cubic light splitter, and the optical part is formed on a surface of the light splitting element away from the first light uniformizing element.

11. The projection device according to claim 7, wherein the illumination system further comprises a beam contraction module comprising a plurality of lenses, wherein the optical part is formed on one of the plurality of lenses, and the optical part is configured to allow the first light beam to pass through.

12. The projection device according to claim 7, wherein the illumination system further comprises a beam contraction module comprising a second light uniformizing element, wherein the optical part is a concave mirror.

13. An illumination system, comprising a light source, a first light uniformizing element, a wavelength conversion element, an optical part, and an array lens wherein the light source is configured to provide a first light beam, the first light uniformizing element is disposed on a transmission path of the first light beam, the wavelength conversion element is disposed on the transmission path of the first light beam and is configured to convert the first light beam into a second light beam, the optical part is disposed on a transmission path of the second light beam, and the wavelength conversion element is disposed between the first light uniformizing element and the optical part, and the wavelength conversion element being disposed between the array lens and the first light uniformizing element, wherein the optical part is formed on a curved surface of the array lens, and the optical part is configured to allow the first light beam to pass through, wherein the second light beam comprises a first portion and a second portion, the first portion is transmitted toward the first light uniformizing element by passing through the wavelength conversion element, and the second portion is transmitted toward the optical part, the second portion is reflected by the optical part, and is further transmitted and passes through the wavelength conversion element for being transmitted toward the first light uniformizing element.

14. The illumination system according to claim 13, wherein the array lens is cemented with the wavelength conversion element.

15. An illumination system, comprising a light source, a first light uniformizing element, a wavelength conversion element, an optical part, and a beam contraction module, wherein the light source is configured to provide a first light beam, the first light uniformizing element is disposed on a transmission path of the first light beam, the wavelength conversion element is disposed on the transmission path of the first light beam and is configured to convert the first light beam into a second light beam, the optical part is disposed on a transmission path of the second light beam, and the wavelength conversion element is disposed between the first light uniformizing element and the optical part, and the beam contraction module comprises a second light uniformizing element, wherein the optical part is formed on a surface of the second light uniformizing element away from the wavelength conversion element, and the optical part is configured to allow the first light beam to pass through, wherein the second light beam comprises a first portion and a second portion, the first portion is transmitted toward the first light uniformizing element by passing through the wavelength conversion element, and the second portion is transmitted toward the optical part, the second portion is reflected by the optical part, and is further transmitted and passes through the wavelength conversion element for being transmitted toward the first light uniformizing element.

16. A projection device, comprising an illumination system, at least one light valve, and a projection lens, wherein:

the illumination system is configured to provide an illumination light beam, and the illumination system comprises a light source, a first light uniformizing element, a wavelength conversion element, an optical part, and an array lens wherein:

the light source is configured to provide a first light beam, the first light uniformizing element is disposed on a transmission path of the first light beam, the wavelength conversion element is disposed on the transmission path of the first light beam and is configured to convert the first light beam into a second light beam, the optical part is disposed on a transmission path of the second light beam, and the wavelength conversion element is disposed between the first light uniformizing element and the optical part, and the wavelength conversion element being disposed between the array lens and the first light uniformizing element, wherein the optical part is formed on a curved surface of the array lens, and the optical part is configured to allow the first light beam to pass through, the at least one light valve is disposed on a transmission path of the illumination light beam for converting the illuminating light beam into an image light beam, and the projection lens is disposed on a transmission path of the image light beam and is configured to project the image light beam out of the projection device, wherein the second light beam comprises a first portion and a second portion, the first portion is transmitted toward the first light uniformizing element by passing through the wavelength conversion element, and the second portion is transmitted toward the optical part, is reflected by the optical part, and is further transmitted and passes through the wavelength conversion element for being transmitted toward the first light uniformizing element.

17. The projection device according to claim 16, wherein the array lens is cemented with the wavelength conversion element.

18. A projection device, comprising an illumination system, at least one light valve, and a projection lens, wherein:
the illumination system is configured to provide an illumination light beam, and the illumination system comprises a light source, a first light uniformizing element, a wavelength conversion element, an optical part, and a beam contraction module, wherein:
the light source is configured to provide a first light beam,
the first light uniformizing element is disposed on a transmission path of the first light beam,
the wavelength conversion element is disposed on the transmission path of the first light beam and is configured to convert the first light beam into a second light beam, and the optical part is disposed on a transmission path of the second light beam, and the wavelength conversion element is disposed between the first light uniformizing element and the optical part, and
the beam contraction module comprises a second light uniformizing element, wherein the optical part is formed on a surface of the second light uniformizing element away from the wavelength conversion element, and the optical part is configured to allow the first light beam to pass through,
the at least one light valve is disposed on a transmission path of the illumination light beam for converting the illuminating light beam into an image light beam, and
the projection lens is disposed on a transmission path of the image light beam and is configured to project the image light beam out of the projection device, wherein the second light beam comprises a first portion and a second portion, the first portion is transmitted toward the first light uniformizing element by passing through the wavelength conversion element, and the second portion is transmitted toward the optical part, is reflected by the optical part, and is further transmitted and passes through the wavelength conversion element for being transmitted toward the first light uniformizing element.

\* \* \* \* \*